H. HAYASHI.

WRAPPING DEVICE.

APPLICATION FILED APR. 11, 1917.

Reissued June 19, 1917. 14,318.

Witness:

Ed C Davison

Inventor

Harry Hayashi.

By Pond & Wilson

Attys

THE NORRIS PETERS CO., PHOTO-LITHO., WASHINGTON, D. C.

UNITED STATES PATENT OFFICE.

HARRY HAYASHI, OF ELMHURST, CALIFORNIA.

WRAPPING DEVICE.

14,318. Specification of Reissued Letters Patent. Reissued June 19, 1917.

Original No. 1,183,454, dated May 16, 1916, Serial No. 78,515, filed February 15, 1916. Application for reissue filed April 11, 1917. Serial No. 161,357.

*To all whom it may concern:*

Be it known that I, HARRY HAYASHI, a subject of the Emperor of Japan, residing at Elmhurst, in the county of Alameda and State of California, have invented certain new and useful Improvements in Wrapping Devices, of which the following is a specification.

The hereinafter described invention relates to wrapping devices, and while it is illustrated and described as particularly designed for use in connection with flower nurseries, flower stores and stands for permitting the quick and efficient wrapping of potted plants without injury thereto, it is also capable of more general use.

Ordinarily, but more particularly during the holiday season, it is required that potted plants sold be quickly wrapped for immediate delivery to the customer, and the usual custom or rather the custom prevailing at this time is to wrap the flower or plant by surrounding the same with loose paper, the free edges or ends of which are either tied or pinned together. Owing to the delicate nature of the article being wrapped, great care must be exercised to avoid injury to the flowers of the plant and equally so to the small branches thereof, and to avoid stripping the leaves therefrom, and this requires that those to whom the wrapping of the potted plants are intrusted be skilled operators, for otherwise much injury will be done to the wrapped plant.

The essential objects of the present invention are to eliminate the use of experienced operators and by so doing materially reduce the expense incident to the wrapping of articles to be delivered to customers; to provide a device which will permit of the employment of inexperienced operators and, in fact, children, for the wrapping of growing plants for delivery; one which shall be simple of construction, efficient and inexpensive as to manufacture, and by means of which growing plants may be quickly wrapped and the flowers and small branches thereof fully protected.

To comprehend the invention, reference should be had to the accompanying sheet of drawings, wherein—

Figure 1:
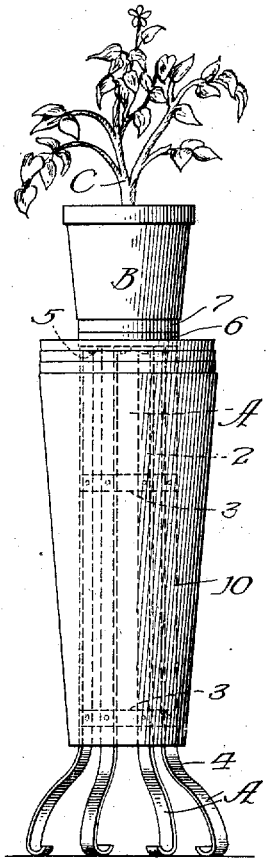
Figure 1 is a view of the wrapping stand with a potted plant supported thereon in position for wrapping, and the nested wrapping envelops in assembled position relative to the stand.
Figure 3:
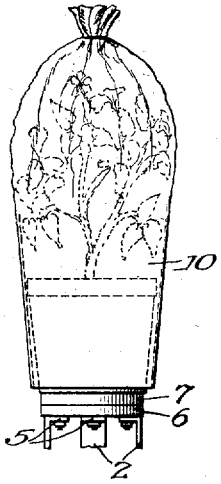
Fig. 3 is a similar view illustrating the withdrawn wrapping envelop fully positioned with respect to the potted plant to inclose the same and the upper end thereof secured together for thorough protection of the wrapped plant.

In the drawings, the letter A is used to designate a stand constructed of any desired material and suitably shaped. In its preferred form, the said stand comprises a series of vertically disposed spaced legs 2, united one to the other throughout the length thereof by the spaced tie or brace members 3, and the lower end portion 4 of each leg 2 is gradually outwardly inclined to provide an enlarged base member A′ for the said stand and to the upper inwardly flanged ends 5 of the legs 2 is united a head plate 6, forming means to receive and support a potted plant to be wrapped. There is thus formed a pedestal for the reception of potted plants to be wrapped, having sufficient rigidity to withstand hard usage and formed with a base member providing a solid, substantial support.

Due to the fact that flower pots vary in size, preference is given to the providing of a removable top or support 7 for the stand or pedestal A, so that different size tops may be utilized if required for pots of varying diameter. For this purpose the top 7 is provided with a threaded depending stud 8, which screws into a threaded socket plate 9 countersunk within the head plate 6. In case the top 7 should prove to be of a diameter too small or too large for the diameter of the flower pot to be placed thereon for the wrapping of the flower therein, said top 7 may be readily removed and a top of proper size secured to the pedestal. However, only in exceptional cases will it be required to utilize a substitute top, inasmuch as a top of standard size may be employed for all flower pots excepting those of unusual diameter.

Figure 2:
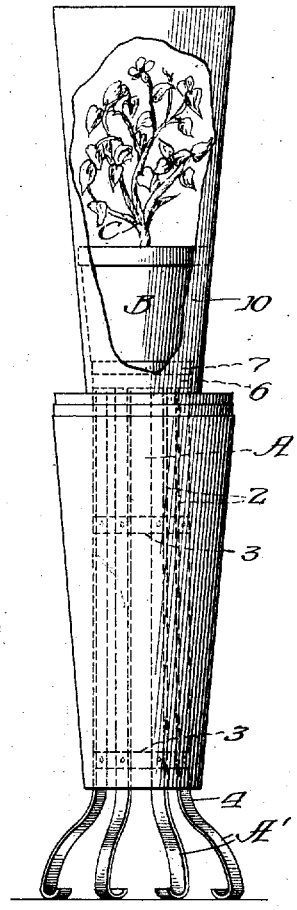
Fig. 2 is a similar view illustrating one of the wrapping envelops partly broken away and removed from its nested position and raised to partly embrace the potted plant.
Figure 4:
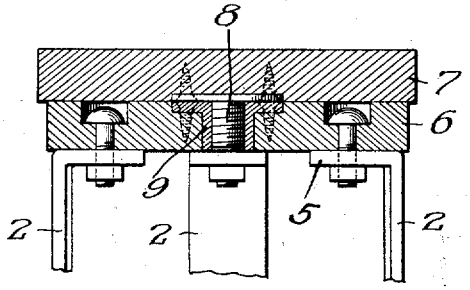
Fig. 4 is a broken detail view disclosing one manner of uniting the receiving platform to the stand.

Over the pedestal A is positioned one or more open ended wrapping envelops 10, constructed of suitable wrapping material, preferably paper, and preferably resting upon and supported by the outwardly flared base member portion A′ of the said pedestal, so that the envelops are situated within convenient reach of the operator engaged in the wrapping of the potted plants. These envelops are preferably although not necessarily frusto-conical in shape and open at top and bottom, the open bottom end of the envelops being lowermost relative to the platform of the pedestal, leaving the other open end uppermost. When frusto-conical envelops are employed a series of them may be nested in convenient position below the plant support with their larger ends uppermost, as shown in Figs. 1 and 2.

In the operation of wrapping the potted plants the greatest care must be exercised in preventing the breaking of the small branches, leaves and damaging the flowers and they must be so wrapped that injury will not result to the plant while being transported from place to place or delivered by messengers. As before stated, with the rush of work during holiday seasons the wrapping of plants must be rapidly performed and with the hand work of wrapping which requires the handling of the plants, this work must be performed by skilled workmen.

With the present invention, a child or inexperienced workman can perform the work of wrapping as rapidly and more efficiently than an expert wrapper under the method of wrapping at present employed.

In using the device one or more wrapping envelops of the requisite size is placed over the pedestal or flower support to be in convenient reach of the operator. The potted plant to be wrapped is seated on the pot-support or top 7. An operator then lifts an envelop upwardly until the upper end of the envelop extends well above the top of the plant C to be wrapped. It is then only required that the person engaged in the work of wrapping draw together the upper open end of the envelop and tie the same in any suitable manner, the plant being then properly wrapped and ready for removal. If the envelops are of tapering form, it is obvious that as drawn upwardly to inclose the plant, the outstanding branches of the plant and the leaves thereof are gradually forced upwardly and drawn together, thus preventing breaking thereof while at the same time placing the same in compact form. Furthermore, the conical bottom will snugly embrace the tapered pot and prevent the envelop from slipping up too far. This manner of wrapping or packing the potted plants insures the keeping thereof in good condition after leaving the store until delivered to the customer, and permits the wrapping or packing of the plant in less time and in a more efficient manner than the hand work of wrapping a paper around the same, and again less material is utilized in the wrapping than is required under the old manner of wrapping, which is an item of importance where hundreds of potted plants are wrapped per day.

From the foregoing description, it will be understood that the wrapping device of the present invention is complete in itself, exclusive of the wrapping envelops, in that it includes a pedestal and an article-supporting top or head thereon, which parts together constitute a core for insertion within an open-ended wrapping envelop to maintain the same in open or distended condition and in a vertical position in readiness to be drawn upwardly around the article to be wrapped, which is supported on the seat, the base member A′ formed by the outwardly-inclined lower portions of the legs 2, also constituting a support on which the lower edge of an envelop rests and is supported in an upright position.

The invention described will readily appeal and commend itself to those conversant with the subject thereof and more particularly to that class of florists desiring to serve their customers in the best possible manner. Considering the time and material saved, the wrapped condition of the plant and the fact that inexperienced wrappers may be employed, the wrapping is more efficient and much cheaper than any of the methods at present employed.

While the preferred form of pedestal has been illustrated and described, any suitable form of pedestal, coming within the scope of the appended claims, may be employed which will hold one or more wrapping envelops nested or otherwise arranged and capable of being drawn upwardly to inclose an article to be wrapped.

Having thus described the invention what is claimed as new and desired to be protected by Letters Patent is:—

I claim:

1. A device for the wrapping of potted plants, the same comprising a pedestal for receiving and supporting a potted plant to be wrapped, and a nested series of wrapping envelops fitted over said pedestal and adapted to be successively removed and upwardly drawn to inclose a plant to be wrapped.

2. A device for the wrapping of potted plants, the same comprising a pedestal for receiving and supporting a potted plant for wrapping provided with an enlarged base member, and a series of nested frusto-conical shaped open ended wrapping envelops fitted over said pedestal and supported by the base member thereof, said envelops adapted to be successively removed and drawn upwardly to inclose a plant to be wrapped.

3. A device for the wrapping of potted plants, the same comprising a pedestal for supporting a plant to be wrapped, a pot-support removably secured to the upper end of said pedestal, and a series of nested wrapping envelops fitted over the pedestal and adapted to be successively removed and upwardly drawn to inclose a plant to be wrapped.

4. A device for use in the wrapping of potted plants, the same comprising a supporting structure for receiving potted plants to be wrapped, and a series of nested frusto-conical wrapping envelops fitted thereover and adapted to be successively removed and upwardly drawn to inclose the plant to be wrapped.

5. A device for wrapping potted plants, comprising means for supporting a potted plant in position to be wrapped, and an open ended wrapping envelop disposed vertically beneath the plant and in position to be drawn upwardly around the plant to inclose the same.

6. A device for wrapping potted plants, comprising a pedestal for supporting a plant to be wrapped, and an open ended envelop embracing the pedestal beneath the plant in position to be drawn upwardly around the plant to inclose the same.

7. A device for wrapping potted plants, comprising a pedestal for supporting a plant to be wrapped, and an open ended frusto-conical envelop embracing the pedestal beneath the plant in position to be drawn upwardly around the plant to inclose the same.

8. A wrapping device comprising a pedestal having at its upper end a seat to support the article to be wrapped, and an open-ended wrapping envelop surrounding the pedestal and removable endwise therefrom, the dimensions of said seat being such as to permit of the envelop being moved upwardly thereacross and clear thereof.

9. A wrapping device comprising a pedestal having at its top a seat to support the article to be wrapped, an open-ended wrapping envelop embracing the pedestal and removable endwise therefrom, and means on the pedestal engaged by the bottom of the envelop to support the same on the pedestal, the dimensions of the seat being such as to permit of the envelop being moved upwardly thereacross and clear thereof.

10. A wrapping device comprising a pedestal having leg standards which flare outwardly and constitute a base for the pedestal, an article-supporting seat at the top of the pedestal, and an open-ended wrapping envelop embracing the pedestal and removable endwise therefrom, the lower edge of the envelop engaging and supported by the base portion of the pedestal, the dimensions of the article-supporting seat being such as to permit of the envelop being moved upwardly thereacross and free thereof.

11. A wrapping device comprising a pedestal having at its top a seat to support the article to be wrapped, an open-ended wrapping envelop embracing the pedestal and removable endwise therefrom, the pedestal being provided with an envelop support of which the envelop rests at its bottom edge, the dimensions of the article-supporting seat being such as to permit of the envelop being moved upwardly thereacross and free thereof.

12. A wrapping device for holding and supporting an open-ended wrapping envelop in an open and distended condition, comprising a pedestal provided at its top with an article-supporting seat and at a lower portion with a support on which the lower edge of an envelop is adapted to rest and be supported, said pedestal and article-supporting seat constituting a core to go inside of an envelop and maintain the same in an open and distended condition, substantially as and for the purpose described.

13. A wrapping device for holding and supporting an open-ended wrapping envelop in an open and distended condition, comprising a pedestal provided at its top with an article-supporting seat and at a lower portion with a support for the lower edge of a wrapping envelop, said pedestal and seat adapted to go inside of an envelop with the envelop engaging at its lower edge on the support, the seat being of a shape and size to fit snugly within the top of an envelop and also spaced from the support a distance substantially the same as the length of the envelop, substantially as and for the purpose described.

HARRY HAYASHI.

Copies of this patent may be obtained for five cents each, by addressing the "Commissioner of Patents, Washington, D. C."